(12) United States Patent
Li et al.

(10) Patent No.: US 8,712,726 B2
(45) Date of Patent: Apr. 29, 2014

(54) SYSTEM AND METHOD FOR PREDICTING REMAINING USEFUL LIFE OF DEVICE COMPONENTS

(75) Inventors: Zhiguo Li, Webster, NY (US); Gregory Kott, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 718 days.

(21) Appl. No.: 12/957,603

(22) Filed: Dec. 1, 2010

(65) Prior Publication Data

US 2012/0143564 A1 Jun. 7, 2012

(51) Int. Cl.
G06F 17/18 (2006.01)

(52) U.S. Cl.
USPC .......................................................... 702/179

(58) Field of Classification Search
USPC .......................................................... 702/179
See application file for complete search history.

(56) References Cited

U.S. PATENT DOCUMENTS

| | | | |
|---|---|---|---|
| 7,149,657 B2 | 12/2006 | Goebel et al. | |
| 7,395,188 B1 | 7/2008 | Goebel et al. | |
| 7,430,053 B2 | 9/2008 | Wachter et al. | |
| 7,548,830 B2 | 6/2009 | Goebel et al. | |
| 7,702,485 B2 | 4/2010 | Gross et al. | |
| 7,725,293 B2 | 5/2010 | Bonissone et al. | |
| 7,783,114 B2 | 8/2010 | Bradski et al. | |
| 2009/0299654 A1* | 12/2009 | Garvey et al. | 702/34 |

OTHER PUBLICATIONS

Hastie, T. et al., "Random Forests," *The Elements of Statistical Learning Data Mining, Inference, and Prediction* (2009) Chp. 15, 2nd Edition, Springer Science and Business Media, LLC, New York, pp. 587-602.
Jardine, A. K. S. et al., "A review on machinery diagnostics and prognostics implementing condition-based maintenance," *Mechanical Systems and Signal Processing* (2006) 20:1483-1510.
Klein, J.P. et al., *Survival Analysis: Techniques for Censored and Truncated Data* (2005) Springer Science and Business Media, LLC, New York, 2nd Edition, pp. 45-57, 243-248, 353-391, 393-418.
Meeker, W.Q et al., *Statistical Methods for Reliability Data* (1998) John Wiley & Sons, New York, pp. 1-22, 317-340.
Uckun, S. et al., "Standardizing Research Methods for Prognostics," *2008 International Conference on Prognostics and Health Management*, May 23, 2008.
Wang, P. et al., "Reliability Assessment Based on Degradation Modeling with Random or Uncertain Failure Threshold," *Proceedings of the 2007 Reliability & Maintainability Symposium (Rams)*, Orlando, FL, Jan. 2007.
Zuo, M. J. et al., "Approaches for Reliability Modeling of Continuous-State Devices," *IEEE Transactions on Reliability* (1999) 48(1):9-18.

* cited by examiner

*Primary Examiner* — Tung S Lau
*Assistant Examiner* — Xiuquin Sun
(74) *Attorney, Agent, or Firm* — Kermit D. Lopez; Luis M Ortiz; Ortiz & Lopez, PLLC

(57) ABSTRACT

A method and system for accurately predicting the remaining useful life of devices and components based on rigorous statistical analysis data to reduce service costs by implementing condition-based maintenance. One rigorous statistical model is the general degradation path model, which can be used to generate simulated data that shares similar data characteristics of historical field failure data. This generated data can be used in a reliability study based on, for example, Monte Carlo techniques for RUL prediction. The study can be used to investigate the effects of influential factors such as suspension percentage and heavy-tailed behavior. The remaining useful life prediction is based on both the fixed-time predictors and time-dependent covariates.

20 Claims, 13 Drawing Sheets

SYSTEM AND METHOD FOR PREDICTING REMAINING USEFUL LIFE OF DEVICE COMPONENTS

TECHNICAL FIELD

The disclosed embodiments relate to devices and device components. The disclosed embodiments further relate to techniques for the condition-based maintenance of devices and device components. The disclosed embodiments also relate to statistical techniques for determining the remaining useful life of devices and various device components.

BACKGROUND OF THE INVENTION

System design requires that system components possess an extremely high reliability, even after long periods of time and use. Many failure mechanisms can be traced to an underlying degradation process of components. When it is possible to assess and measure a component's degradation, such measures often do not provide failure time data for purposes of assessing and improving product reliability. Gathered data may include usage patterns, environment conditions, fault/error logs such as fault codes, system sensing data such as engineering push data, and machine status collected daily. Many of these variables may be potentially related to the system failures, but do not provide accurate information on degradation of components. Thus, it is difficult to assess reliability with traditional life tests that record only failure time. Further, direct observation of a component's degradation level may be impossible in some products. A relationship between component failure and amount of degradation would make it possible to use degradation models and data to make inferences and predictions about failure time.

In general, techniques used to predict remaining useful life could apply to anything that wears out for any reason, over some period of time, or other appropriate units or measurement. Examples of device components in electrical-mechanical systems, such as in a rendering device, that wear out prior to that system's typical end-of-life are as follows: fuser assembly and many fuser components such as fuser rolls, fuser fingers and fuser sensors and switches; media path feed and drive rolls, gears/motors, and drive belts; electrical sensors and connectors in electrical systems; charge devices such as the corotrons and scorotrons; photoreceptor cleaners, intermediate belt cleaner, and fuser roll cleaners; and intermediate belt in tandem systems, etc. Techniques to predict remaining useful life, or remaining useful period, could also be used in biological systems where factors such as temperature, stress, gender, or location affect remaining useful life. Such systems include, for example, human body systems such as for cancer research, animal-related systems, and plant/tree life. Remaining useful life prediction could also be used for beach and land/hill erosion estimations and weather events such as for tornadoes and hurricanes, for example.

Maintenance policies of various device components and other computer systems have recently evolved to account for predictions of component failure time. Instead of reactive firefighting following component failure, maintenance policies could utilize proactive maintenance to reduce service costs and increase the equipment's availability. Condition-based maintenance (CBM) is one such proactive maintenance policy. CBM is a decision making strategy where preventive maintenance actions are performed on devices based on the working conditions of the system and its components. Devices and components using CBM may include: rendering and printing systems, CT/MRI machines, servers and OEM systems, servers and hard drives, photoreceptors, the US Military's Joint Strike Fighter Program and the Future Combat Systems Program, and NASA-launch vehicles and spacecraft, etc. In some situations, especially when a fault or failure can be catastrophic (e.g. nuclear power plant), it is more desirable to accurately predict the chance that a machine operates without a fault or a failure up to some future time, such as the next inspection interval, given the current machine condition and past operation profile. The probability that a machine operates without a fault until the next inspection or condition monitoring interval could be a good reference for CBM assessments on appropriate inspection intervals for components.

Techniques utilized in a CBM program can be classified into two main categories: diagnostics and prognostics. Diagnostics focuses on detection; isolation, and identification of root causes when faults/failures occur. Using prognostics aids in predicting the failures or faults before they occur in order to schedule preventive maintenance, to minimize unscheduled failures, increase machine uptime and reduce service costs.

For example, in machine prognostics, there exist two main prediction types: prediction of RUL for the device and device components, and prognostics incorporating maintenance policies. A significant part of CBM decisions are based on Remaining Useful Life (RUL) estimates of a device and components. Also known as the remaining service life, the RUL is the residual life left for a system or component before failure occurs. The RUL requires accurate information about the remaining residual life of a system or component before a failure occurs, while taking into account both the current and past machine operation conditions and operation profiles. Previous RUL estimations used ad-hoc prediction experimental methodologies that lack statistical rigor.

Because no known rigorous statistical systems or methods have been developed to generate the data that shares the similar characteristics with field failure data, a reliability study based on Monte Carlo techniques for RUL prediction could not be performed. Therefore, a rigorous statistical system and methodology is needed for a reliability study to predict the RUL of computing device components such as, for example, photoreceptors. One such rigorous statistical model is the General Path Model, also known as the General Degradation Path Model. The General Path Model is used to generate simulated data that shares similar data characteristics of historical field failure data. This generated data can be used in a Monte Carlo study for RUL prediction to investigate the effects of influential factors such as suspension percentage and heavy-tailed behavior. The RUL prediction needs to be based on both the fixed-time predictors (such as the market segment) and the time-dependent covariates (e.g., dark decay, printing rate, etc.).

The Random Forest Model is another statistical analysis system that could be used to accurately estimate RUL. The Random Forest Model involves independent training decision trees, such as classification and regression trees, on a set of data points. A random forest is a "forest" of decisions trees, where each tree may be randomly perturbed during training on the data points from the other trees to produce independent trees. The Random Forest Model can also be used for accurately predicting RUL based on both fixed-time predictors and time-dependent covariates, which are both contained in the field data of photoreceptors, for example.

Therefore, a need exists for a method to accurately predict the RUL of devices and device components based on rigorous statistical analysis data to reduce service costs by implementing condition-based maintenance.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for improved devices and device components.

It is another aspect of the disclosed embodiments to provide for improved condition-based maintenance of devices and device components.

It is a further aspect of the disclosed embodiments to provide for statistical techniques to accurately determine the remaining useful life of devices and various device components.

The above and other aspects can be achieved as is now described. A method and system for accurately predicting the remaining useful life of devices and device components based on rigorous statistical analysis data to reduce service costs by implementing condition-based maintenance is disclosed. One such rigorous statistical model is the general degradation path model. The General Path Model is used to generate simulated data that shares similar data characteristics of historical field failure data. This generated data can be used in a reliability study based on Monte Carlo techniques for RUL prediction. The study can be used to investigate the effects of influential factors such as suspension percentage and heavy-tailed behavior. The remaining useful life prediction is based on both the fixed-time predictors (such as the market segment) and the time-dependent covariates (e.g., dark decay, printing rate, etc.). The Random Forest Model can also be used for accurately predicting remaining useful life based on both fixed-time predictors and time-dependent covariates, which are both contained in the field data of a component. A relationship between component failure and amount of degradation makes it possible to use degradation models for accurate predictions of failure time.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
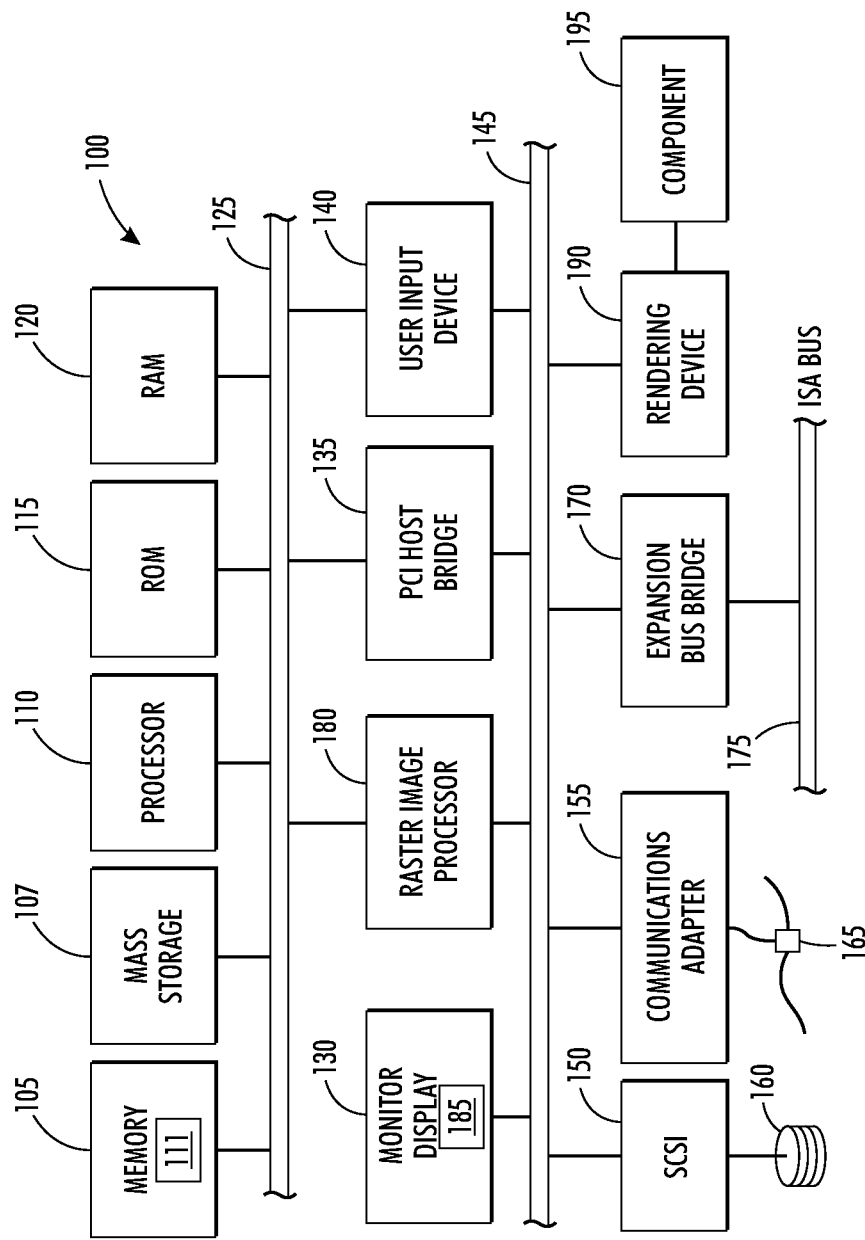
FIG. 1 illustrates a block diagram of a sample data-processing apparatus, which can be utilized for processing secure data, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, or computer program usable medium or computer program product. Accordingly, the disclosed embodiments can in some instances take the form of an entire hardware embodiment, an entire software embodiment or an embodiment combining software and hardware aspects all generally referred to herein as a "module." Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., WiFi, Wimax, 802.xx, and cellular network, or the connection may be made to an external computer via most third party supported networks (for example, through the Internet using an Internet Service Provider).

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates a block diagram of a sample data-processing apparatus 100, which can be utilized for processing the remaining useful life of various device components to assist in condition-based maintenance of those components, in accordance with the disclosed embodiments. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a mass storage 107 (e.g., hard disk), a processor (CPU) 110, a Read-Only Memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 includes software module in the form of routines and/or subroutines for carrying out features of the present invention and can be additionally stored within memory 105 and then retrieved and processed via processor 110 to perform a particular task. A user input device 140, such as a keyboard, mouse, or another pointing device, can be connected to a PCI (Peripheral Component Interconnect) bus 145. Module 111 can be adapted for providing a graphical user interface (not shown) for providing remaining useful life predictions. Processor 110 can be adapted to process a rigorous statistical analysis of field failure data to accurately predict remaining useful life of a device or device component.

Data-process apparatus 100 can thus include CPU 110, ROM 115, RAM 120, and a device 190 (e.g., rendering device, printer, copier, scanner, xerography equipment etc.), a device component 195, which are also coupled to a PCI (Peripheral Component Interconnect) local bus 145 of data-processing apparatus 100 through PCI Host Bridge 135. The PCI Host Bridge 135 can provide a low latency path through which processor 110 may directly access PCI devices mapped anywhere within bus memory and/or input/output (I/O) address spaces. PCI Host Bridge 135 can also provide a high bandwidth path for allowing PCI devices to directly access RAM 120.

A communications adapter 155, a small computer system interface (SCSI) 150, a raster image processor (RIP) 180, and an expansion bus-bridge 170 can also be attached to PCI local bus 145. The communications adapter 155 can be utilized for connecting data-processing apparatus 100 to a network 165. SCSI 150 can be utilized to a control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface.

The embodiments described herein can be implemented in the context of a host operating system and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module that can embody features of the present invention is remaining useful life prediction module 155, depicted in FIG. 2.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD-ROMs and transmission-type media such as analogue or digital communications links.

Figure 2:
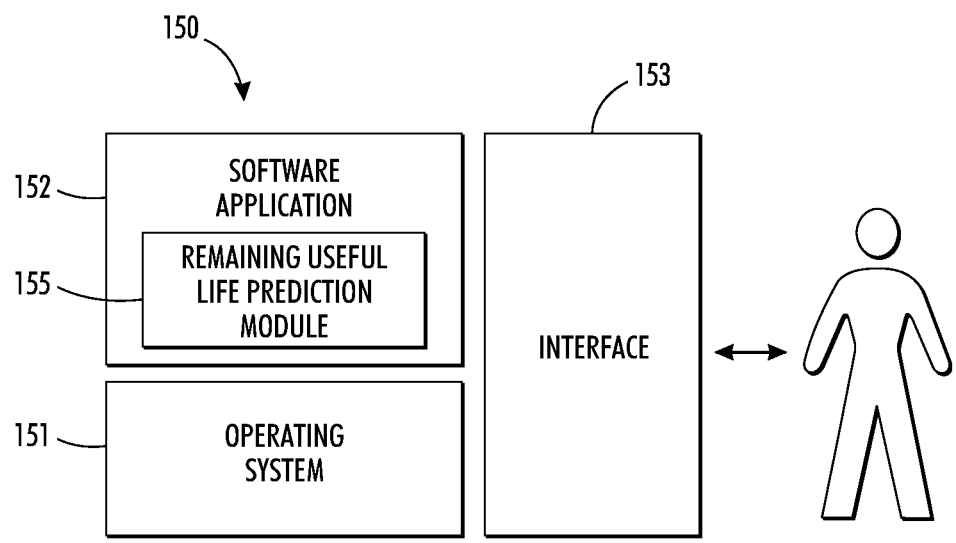
FIG. 2 illustrates a schematic view of a software system including an operating system, application software, and a user interface for carrying out the disclosed embodiments.

FIG. 2 illustrates a schematic view of a software system 150 including an operating system, application software, and a user interface for carrying out the disclosed embodiments. Computer software system 200 directs the operation of the data-processing system 100 depicted in FIG. 1. Software application 152, stored in main memory 105 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through the interface 153, as shown in FIG. 2. The user's command input may then be acted upon by the data-processing system 100 in accordance with instructions from operating module 151 and/or application module 152.

The interface 153 also serves to display printer and/or host computer print job modification results, whereupon the user may supply additional inputs or terminate the session. In an embodiment, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 151 and interface 153. The software application 152 can include a remaining useful life prediction module 155 that can be adapted to accurately predict the remaining useful life of a device or device component, as described in greater detail herein. The software application 152 can also be configured to communicate with the interface 153 and various components and other modules and features as described herein. The remaining useful life prediction module 155, in particular, can implement instructions for carrying out, for example, the method 500 depicted in FIG. 5, as described below, and/or additional operations as described herein.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program design to assist in the performance of a specific task such as word processing, accounting, inventory management, music program scheduling, etc.

Generally, program modules include routines, programs, objects, components, data structures, etc., that perform particular tasks or implement particular abstract data types. Moreover, those skilled in the art will appreciate that the disclosed method and system may be practiced with other computer system configurations such as, for example, hand-held devices, multi-processor systems, microprocessor-based or programmable consumer electronics, networked PCs, minicomputers, mainframe computers, and the like.

The disclosed embodiments take the guesswork out of maintenance of devices including, for example, both (customer replaced unit) CRU's and high frequency service items (HFSI's). Predicting the remaining useful life (RUL) of a device component provides information on a component's lifespan to prevent both unnecessary maintenance and surprising system and component failures that catch users off guard. The RUL is based on current machine conditions along with past and current operation profiles. RUL is defined as the conditional random variable as follows:

$$T-t | T>t, Z(t) \quad (1)$$

wherein T represents the time to failure, t is the current working age and Z(t) denotes the past condition profile up to the current time. Because the RUL is a random variable, its distribution needs to first be obtained to understand all of its properties.

Figure 3:
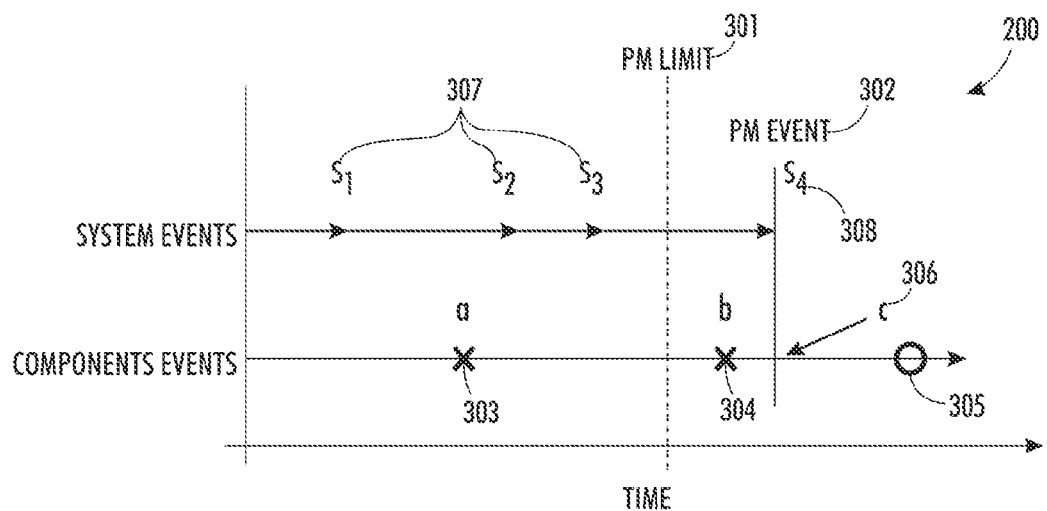
FIG. 3 illustrates a graphical representation of right censoring introduced by a device component, in accordance with the present disclosed embodiments.

FIG. 3 illustrates a graphical representation of right censoring introduced by a device component 200, in accordance with the disclosed embodiments. Current maintenance and service strategies include two preventive maintenance policies for devices and device components: fixed-interval policy (such as for high-frequency service item (HFSI)) and opportunistic policy (such as for customer-replaced units (CRU)). An HFSI denotes a system or component in a system that will likely need to be replaced prior to the system's end of life. A CRU denotes that the component was designed with levers, guides, and instructions, for example, to allow a user to replace the component without the aid of a service engineer. A CRU could have either a fixed-interval or an opportunistic service policy applied.

In both policies, a pre-specified preventative maintenance (PM) limit 301 (unit: kp) is used to determine whether preventive maintenance action is needed. In the region where event "a" 303 resides, the component failure occurred prior to the PM limit 301 and will also be considered as a failure. In the region where event "b" 304 resides, the failure occurred after the PM limit 301 and only because another system event S1, S2, S3 307 (opportunity) did not occur. If a system event 307 had occurred first (such as "S4" 308), then the component would have been replaced preventively at S4 308. S4 308 is considered a right-censored event where the component will never reach its intrinsic life, denoted as event "c" 306. For example, a component such as, for example, a CRU photoreceptor, with a working life that reaches the PM limit 301, will normally be replaced immediately even if it is still functional for a fixed-interval policy. Component failure event "a" 303 in FIG. 3 occurs when the component fails before PM limit 301, but before any other system events 307.

System events S1, S2, S3 307 and S4 308 can describe a number of different events. System events occur when a device and/or device component ceases normal operation, excluding stoppage for evaluation and preventative maintenance of the device and/or device component. S1, S2, S3 307 and S4 308 could denote, for example, a random component failure or failure of another device component under a PM policy (i.e. event "a" 303 or event "b" 304). S1, S2, S3 307 and S4 308 could also be a scheduled inspection other than PM.

A photoreceptor, for example, operating under an opportunistic policy will not be automatically replaced in the same manner as in a fixed-interval policy. In an opportunistic maintenance policy, when a photoreceptor survives longer than the PM limit 301, two different options exist: either (i) the photoreceptor fails and results in an unscheduled maintenance event, or (ii) a failure from other parts/subsystems occurs, creating the PM opportunity and the photoreceptor is replaced. The symbol "x" 304 represents the failure event whereas "o" 305 is the suspension. In the first case, the photoreceptor experiences a failure event 304. In the second case, the life of the photoreceptor is suspended 305 (censored) due to the preventive maintenance action. In the case of a suspension 305, also known as right censoring, the actual life time of a component is greater than its replacement time, but it is unknown by how much.

Figure 4:
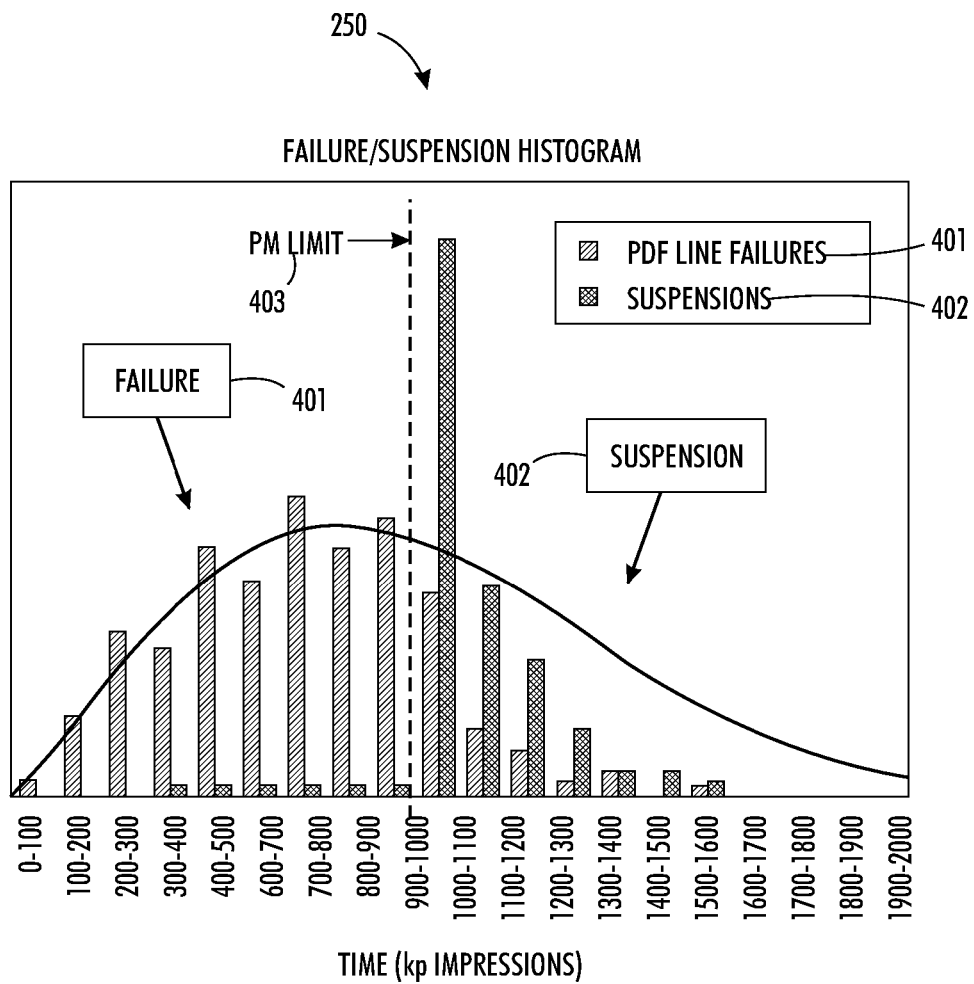
FIG. 4 illustrates a graphical representation of problematic classifications of suspensions and failures, in accordance with the disclosed embodiments.

FIG. 4 illustrates a graphical representation of problematic classifications of suspensions and failures 250, in accordance with the disclose embodiments. It is often unknown whether a component is replaced because of a failure 401 or preventative maintenance action, also known as a suspension 402. Suspensions 402 and failures 401 are often estimated based on the PM limit 403. That is, all events greater than the PM limits 403 are classified as suspensions 402, while events occurring before the PM limits 403 are classified as failures 401. This heuristic classification method results in misclassified suspension 402 and failure 401 events, heavy-tailed behavior of the survival function, and a fat tail in the survival function for the component. Rather than automatically classifying events based on the relationship between the time of occurrence and PM limit 403, the end-of-life event of suspension or failure is the key information used in the disclosed reliability or survival analysis to determine the RUL of a device or device component.

To develop an accurate RUL estimation based on actual reliability data of components, reliability data is collected and used in the General Path Model of analysis. Four RUL predictors incorporated in the collected dataset are: printing rate, area coverage, inferred dark decay signal, and market segment. The first three predictors are time-dependent covariates whose values change over time, and the last is the constant time categorical variable.

Degradation measures can also be used in the RUL analysis. Degradation measures contain more abundant information than the time-to-failure data for assessing or improving the product reliability. Degradation modeling is based on probabilistic modeling of a projected distribution to a predefined failure threshold. The basic idea of the General Path Model, also referred to as Degradation Path Model, is to determine the relationship between component failure and the component's degradation paths. This relationship is then used to make inferences about failure times for accurate reliability predictions. Reliability prediction based on degradation modeling can be an efficient method to estimate reliability for some highly reliable components or systems when failure observation is rare.

The General Path Model is used to estimate the distribution of time-to-failure data. Degradation measurements are denoted as (y) and the actual degradation paths as $P(t)$, $t>0$. The assumption is that the measurements (y) are taken at specified discrete time (e.g. t1, t2, etc.) generally until y reaches a specified critical failure level D, or until a predetermined time tm, whichever comes first. The observed sample degradation path $y_{ij}$ of unit i at time $t_j$ is as follows:

$$y_{ij}=P(t_{ij})+\epsilon_{ij}=f(t_{ij};\phi,\theta_i)+\epsilon_{ij};\ i=1,\ldots,n,j=1,\ldots,m_i \quad (2)$$

wherein $\epsilon_{ij}$ is measurement error which follows the normal distribution of $N(0,\sigma_\epsilon)$. The actual paths $P(t_{ij})=f(t_{ij};\phi,\theta_i)$ often include nonlinear terms in the parameters and the path parameters are classified into two types: fixed-effects parameter ø that are common across all units, and random-effects parameters θi that are random from unit to unit. The random-effects parameters θi are characterized by a multivariate distribution function with the mean and covariance matrix which can be estimated from the data. A 'two-stage' method has been used to estimate the model parameters and Monte Carlo simulation is used to estimate the distribution function of the time-to-failure. Various types of predictors can be handled with the designed system including, but not limited to, the constant time predictor (such as market segment) and the time-dependent covariate (such as dark decay).

Figure 5:
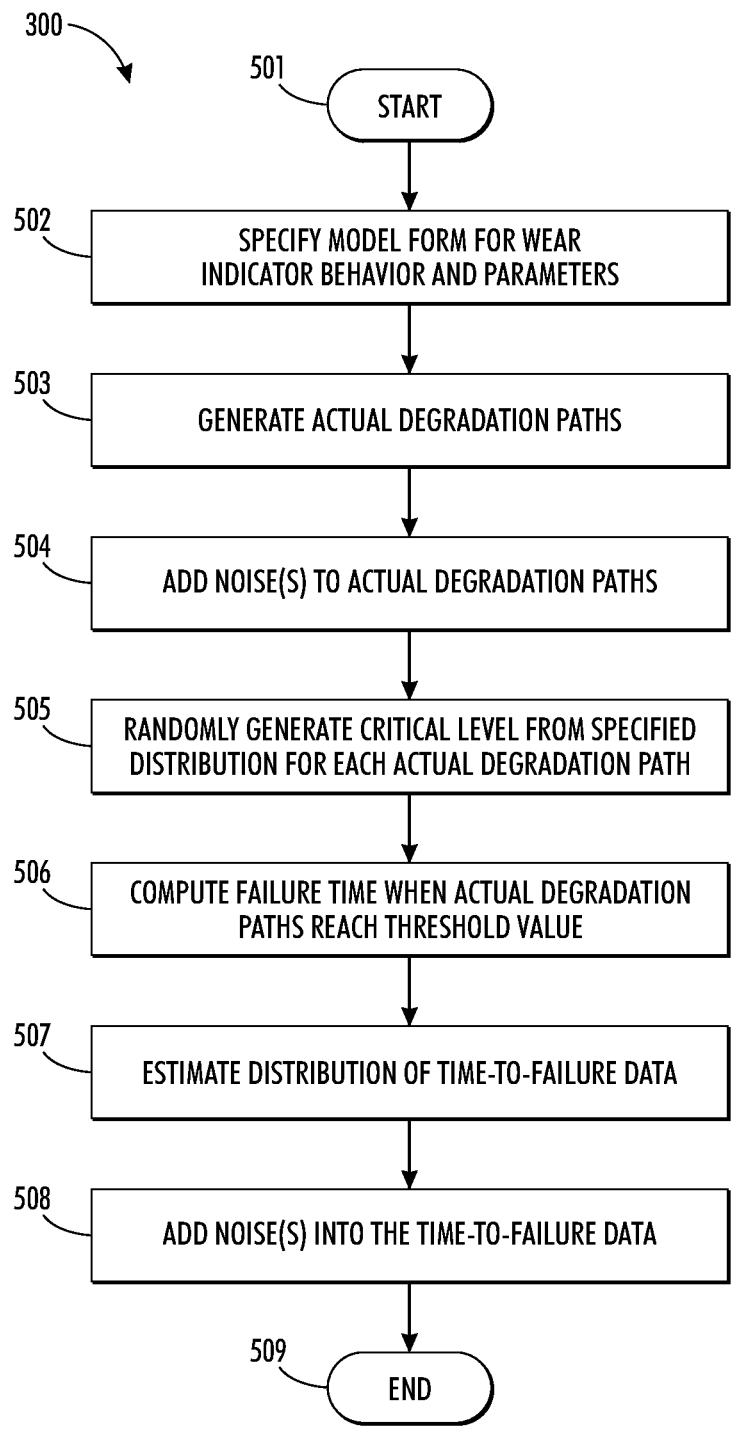
FIG. 5 illustrates a flow chart of operations depicting logical operational steps of a method for generating the time-to-failure data that shares the same characteristics with a device component's use data, in accordance with the disclosed embodiments.

FIG. 5 illustrates a flow chart of operations depicting logical operational steps of a method for generating the time-to-failure data that shares the same characteristics with a device component's use data 300, in accordance with the disclosed embodiments. As illustrated in block 501, the process for generating the time-to-failure data that shares the same characteristics with a component's use data can be initiated. Illustrated in block 502, the model form for the wear indicator behavior xt (time-dependent covariate) and its parameters $\delta=\{\theta,\phi\}$ is specified. The model form for the wear indicator behavior is generated through a regression model, along with some additional predictors x. Additional predictors may include a constant time predictor, $\delta=f(x)+\epsilon\delta, x=\{x1,x2,\ldots\}$. Illustrated in block 503, the actual degradation paths $P(t)$ for n units are generated. Illustrated in block 504, noises $\epsilon$ are added to the actual degradation paths developed in the previous block. As illustrated in block 505, the critical level D from a specified distribution (such as the uniform distribution or normal distribution), is randomly generated for each actual degradation path $P(t)$. As illustrated in block 506, the failure time (Ti) for unit i, i=1, 2, . . . n, is computed once the actual degradation path $P(t_i)$ reaches the threshold value Di. As illustrated in block 507, the distribution of time-to-failure is estimated based on the calculated (n) failure times. As illustrated in block 508, various levels of noises (e.g., censoring, heavy-tail, and misclassification) are added into the time-to-failure data. The process then terminates at block 509.

Figure 6:
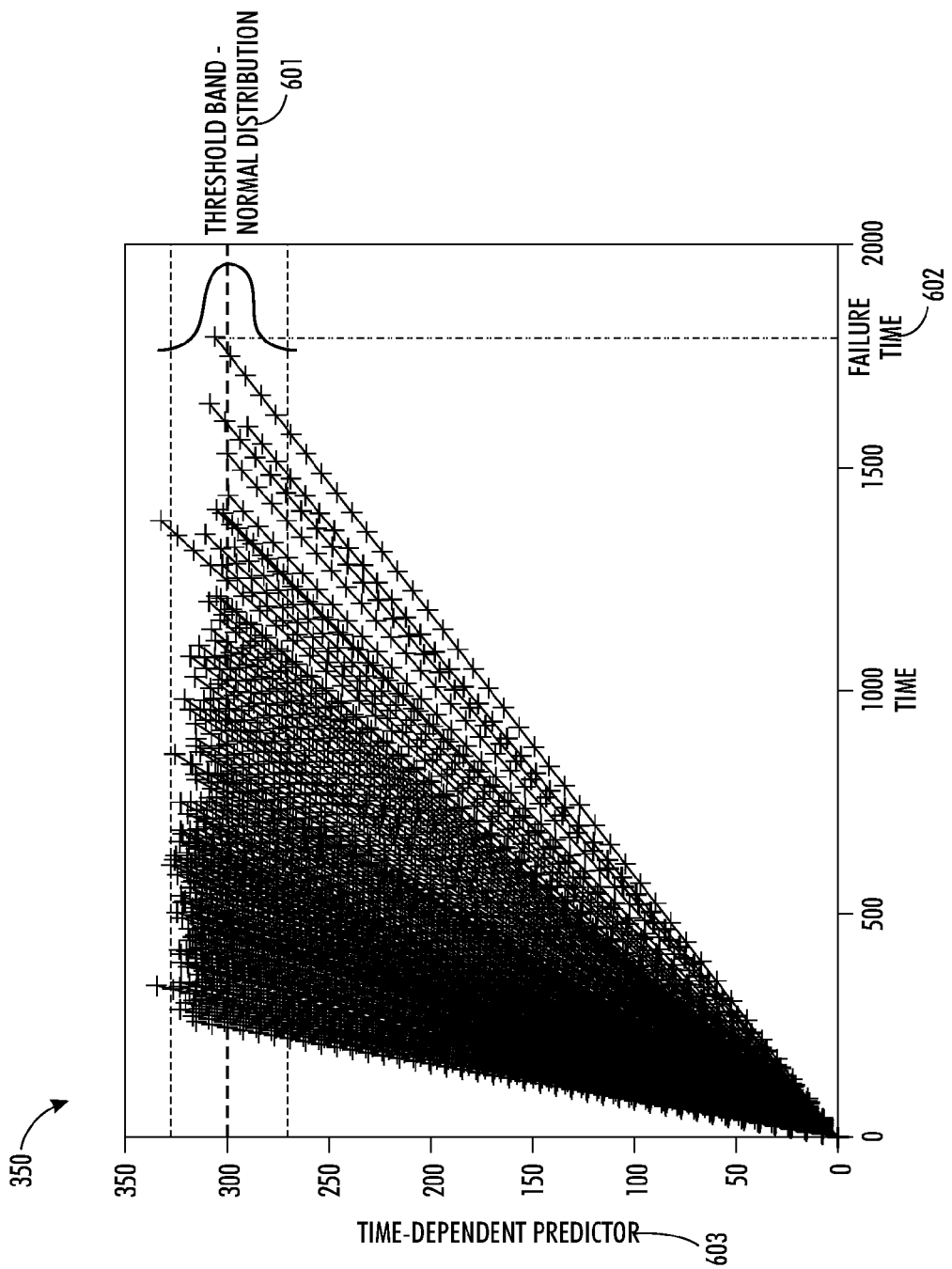
FIG. 6 illustrates a graphical representation of exemplary degradation paths, in accordance with the disclosed embodiments.

FIG. 6 illustrates a graphical representation of exemplary degradation paths 350, in accordance with the disclosed embodiments. The actual paths in different market segments are assumed to have different slope values. The threshold band 601 follows a normal distribution. FIG. 6 plots of the degradation paths for dark decay signals, for example. According to General Path Model, when the actual path reaches its pre-specified threshold value, the corresponding component fails. The failure time 602 is then read from the intersection of the time-dependent predictor 603 (degradation path) with the threshold band.

Figure 7:
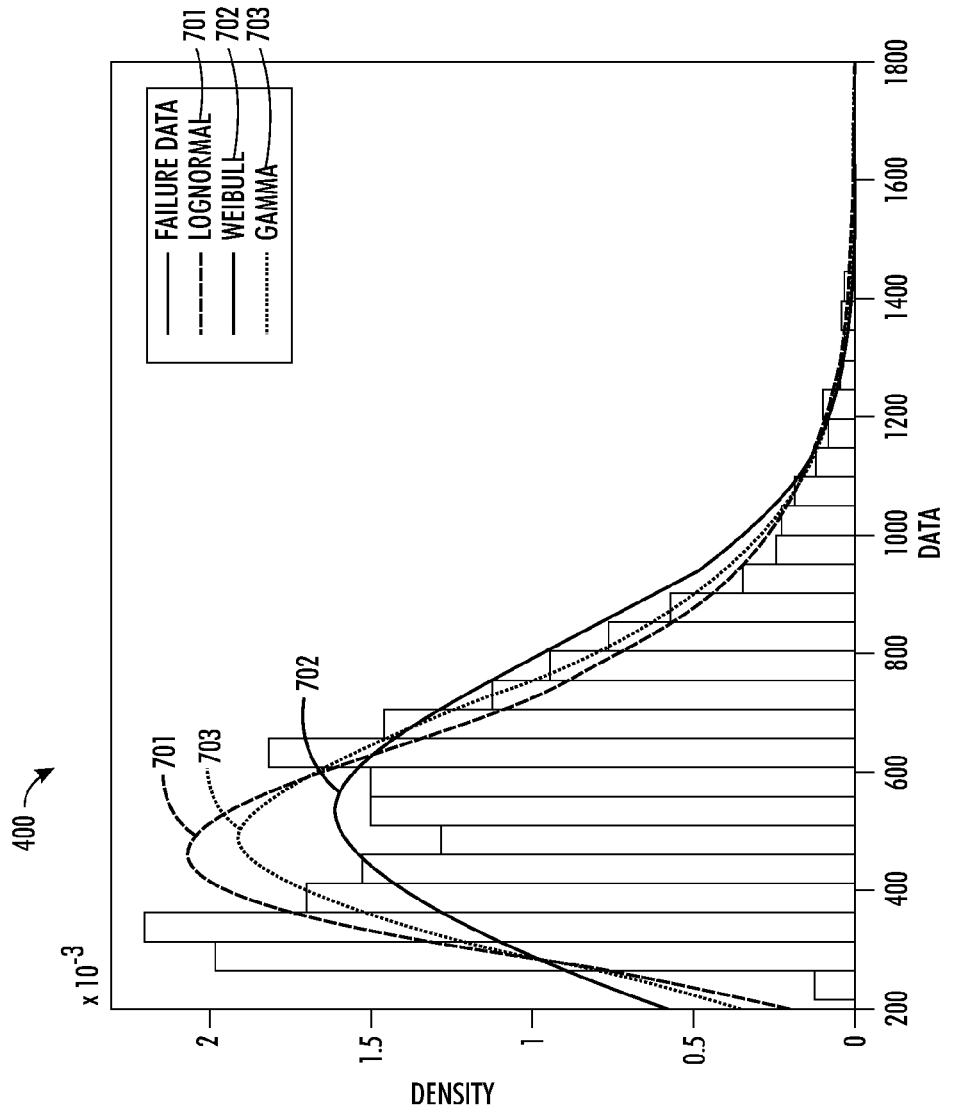
FIG. 7 illustrates a graphically represented histogram of all failure times of device components, in accordance with the disclosed embodiments.

FIG. 7 illustrates a graphically displayed histogram of all failure times of device components 400, in accordance with the disclosed embodiments. As an example, three distributions (the log normal distribution 701, the Weibull distribution 702, and the Gamma distribution 703) are used in a reliability analysis and then fitted to the data. The result shows that the log normal distribution fits the data most appropriately.

Figure 8:
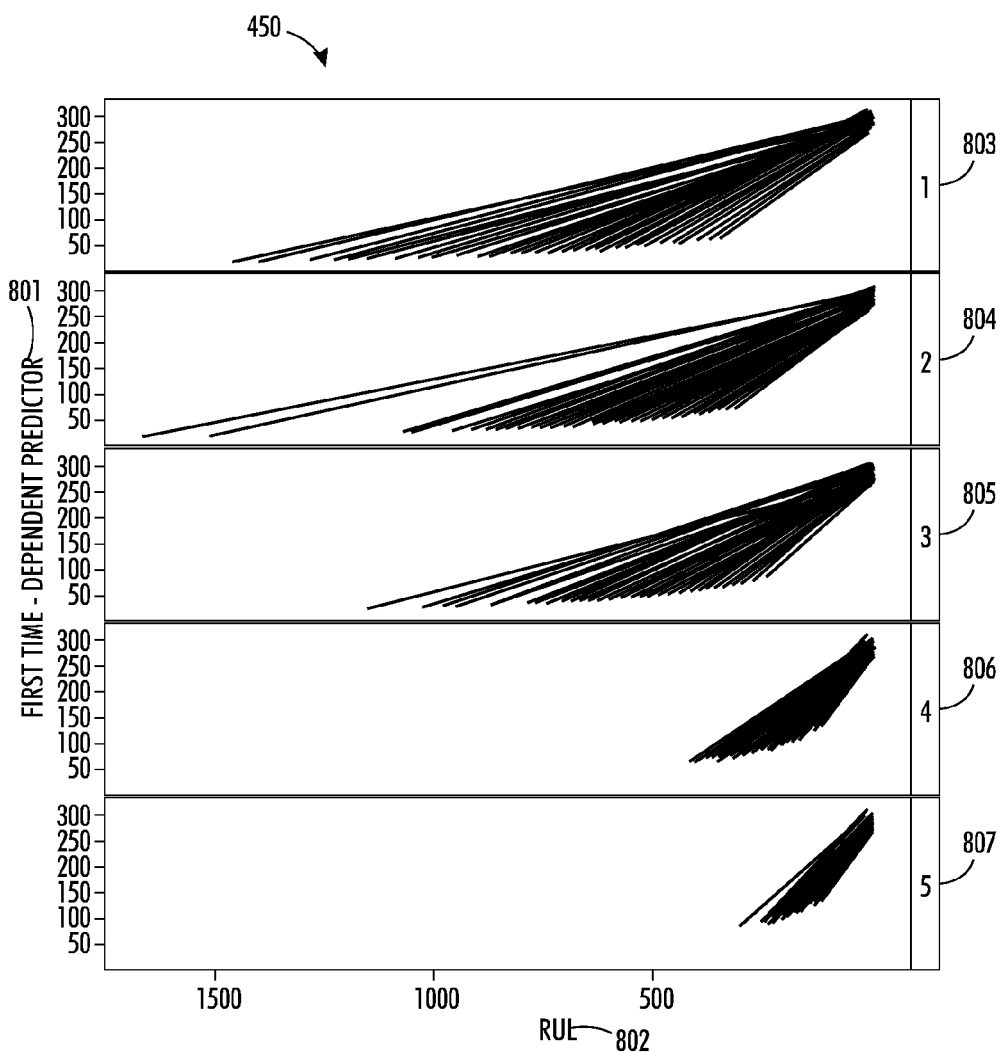
FIG. 8 illustrates a graphical representation of the relationship between a first time-dependent predictor and RUL for each individual market segment, in accordance with the disclosed embodiments.
Figure 9:
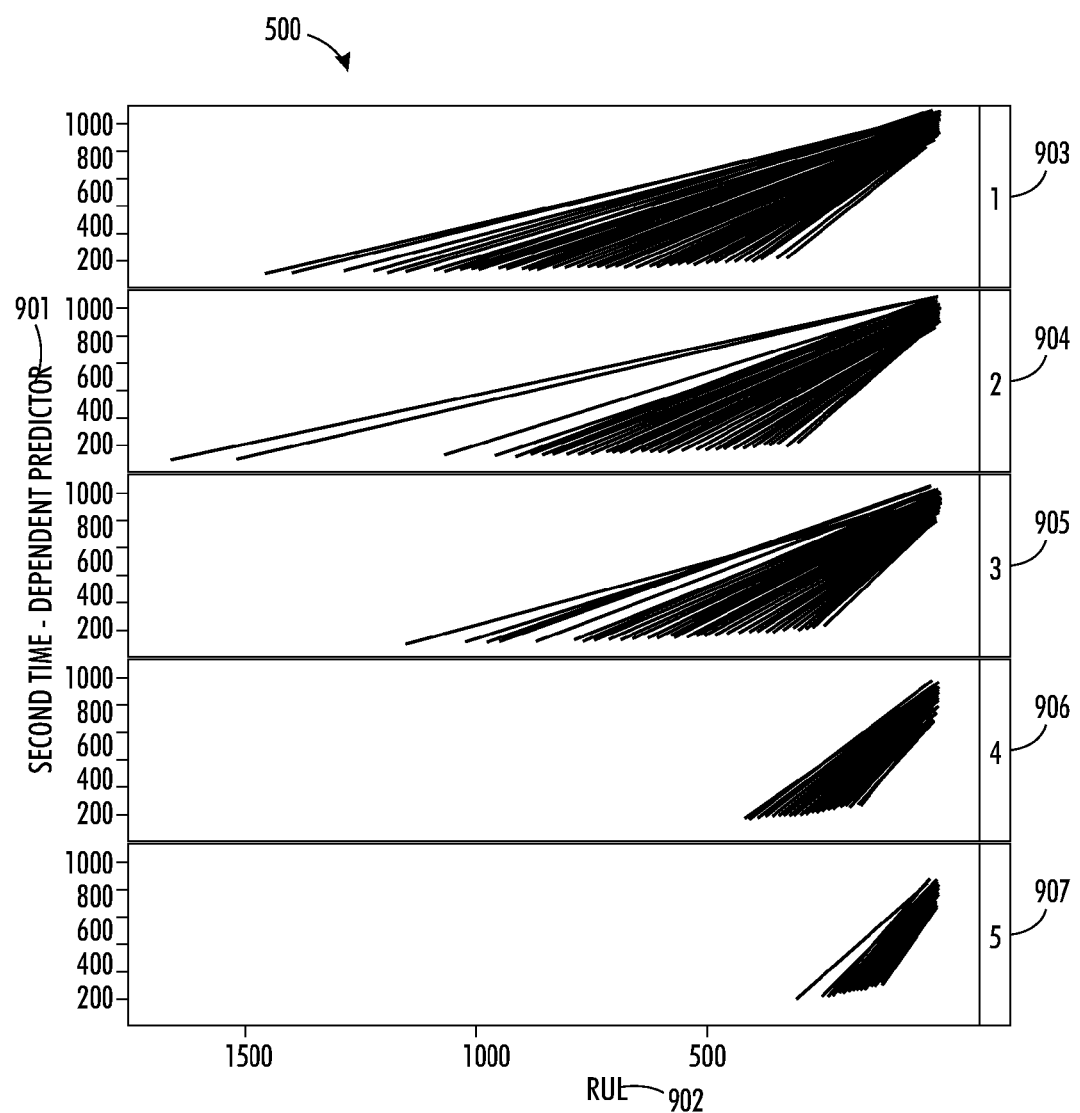
FIG. 9 illustrates a graphical representation of the a second time-dependent predictor comprising a transformed first time-dependent predictor versus RUL for each individual market segment, in accordance with the disclosed embodiments.
Figure 10:
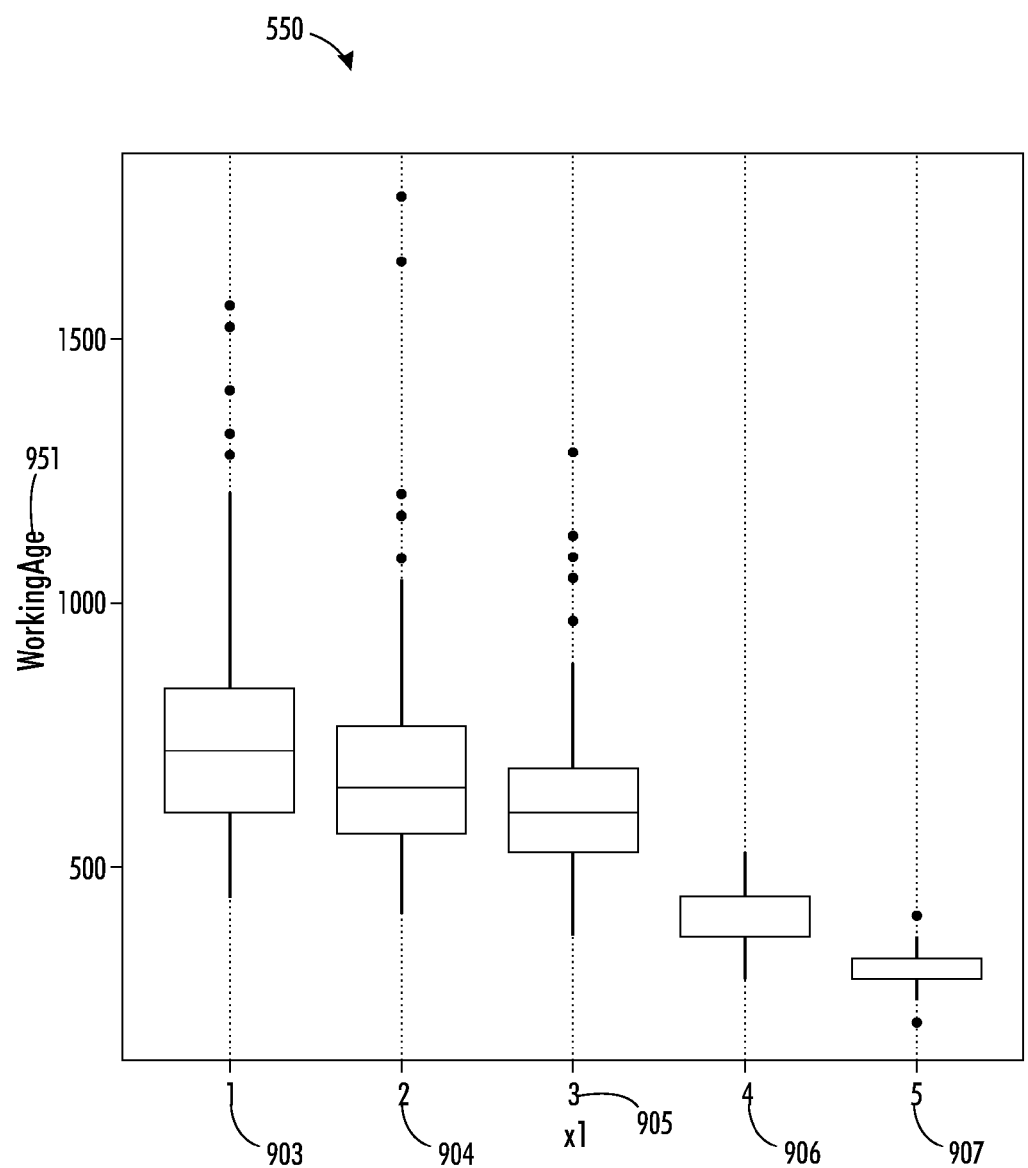
FIG. 10 illustrates a graphical representation of the working age, or total time, a component has been used as compared to the failure times for each individual market segment, in accordance with the disclosed embodiments.

FIGS. 8 to 10 illustrate that the method based on the General Path Model can effectively handle both constant time predictor and time-dependent predictor. FIG. 8 illustrates a graphical representation 450 of the relationship between a first time-dependent predictor 801 and RUL 802 for each individual market segment 803 to 807, in accordance with the disclosed embodiments. FIG. 9 illustrates a graphical representation 500 of the a second time-dependent predictor 901 comprising a transformed first time-dependent predictor 801 versus RUL 902 for each individual market segment 903 to 907, in accordance with the disclosed embodiments. FIG. 10 illustrates a graphical representation of the working age 951, or total, time, a component has been used as compared to the failure times for each individual market segment 903 to 907, in accordance with the disclosed embodiments.

In addition to the General Path Model, additional statistical models are used in accordance with the disclosed embodiments to accurately predict the RUL of device components. One such model is the Random Forest (CF) Method. This method is used to predict the RUL of components such as, for example, photoreceptors. The prediction results indicate that the median prediction error rates are less than 20% in a wide range of the suspension percentage (0%~30%). Accurate RUL predictions are made when events are not classified or misclassified as either a suspension or failure. The disclosed Random Forest Method with misclassification still accurately predicts RUL when the suspension percentage is less than 20%.

The RUL estimation using the General Path Model outperforms results using other statistical models, such as the Cox Proportional Hazards Model. Also known as the Multiplicative Hazards Model, the Cox Proportional Hazards Model exists to allow quantification of the relationship between the time to event and set of explanatory variables. In the Cox Proportional Hazards Model, subjects in a group may have some additional characteristics that may affect their outcome and demographic variables recorded. Such variables may be used as covariates (e.g., explanatory variables, confounders, risk factors, independent variables, etc.) in explaining the response (dependent) variable.

In comparing the accuracy of predicted RUL using Random Forest Method against the Cox Proportional Hazards Model, the survival function and hazard function are first introduced. Let T denote the time to failure. If the density function of T, f(t), exists, then the survival function of T is given by:

$$S(t)=Pr(T>t)=\int_t^\infty f(x)dx \quad (3)$$

The hazard function, also known as hazard rate, or conditional failure rate function in the reliability, is defined as:

$$h(t) = \lim_{\Delta t \to 0} \frac{Pr(t \le T < t+\Delta t \mid T \ge t)}{\Delta t} = \frac{f(t)}{S(t)} \quad (4)$$

The hazard function is interpreted as the "instantaneous" probability that the key event occurs at time t, given that no key event occurs before t. Thus, h(t)Δt can be viewed as the "approximate" probability, a key event will occur in a small time interval between t and t+Δt. If h(t) is known, the function S(t) is calculated according to the following equation:

$$S(t)=\exp[-\int_0^t h(x)dx]=\exp[-H(t)] \quad (5)$$

wherein $H(t)=\int_0^t h(x)dx$ is the cumulative hazard function.

In clinical trials, for example, the Cox model is used to investigate how some covariates affect the hazard rate and survival of patients who have been given a kidney transplant, for example. Time-to-death data from different patients are analyzed—the covariates examined include gender and age of patients. Let h[t|Z(t)] be the hazard rate at time t for a subject with covariate vector Z(t), then the basic Cox model is as follows:

$$h[t \mid Z(t)] = h_0(t)\exp[\beta^T Z(t)] = h_0(t)\exp\left[\sum_{k=1}^s \beta_k Z_k(t)\right] \quad (6)$$

wherein $h_0(t)$ is the baseline hazard rate function. The proportional hazards model indicates that the hazard rate of a subject is proportional to its baseline hazard rate $h_0(t)$. In the model, β is the coefficient vector and $Z(t)=[Z_1(t), Z_2(t), \ldots, Z_s(t)]^T$ is the covariate vector. $Z_i(t)$, i=1, 2, . . . s, is a time-dependent covariate with its value varying with time.

Figure 11:
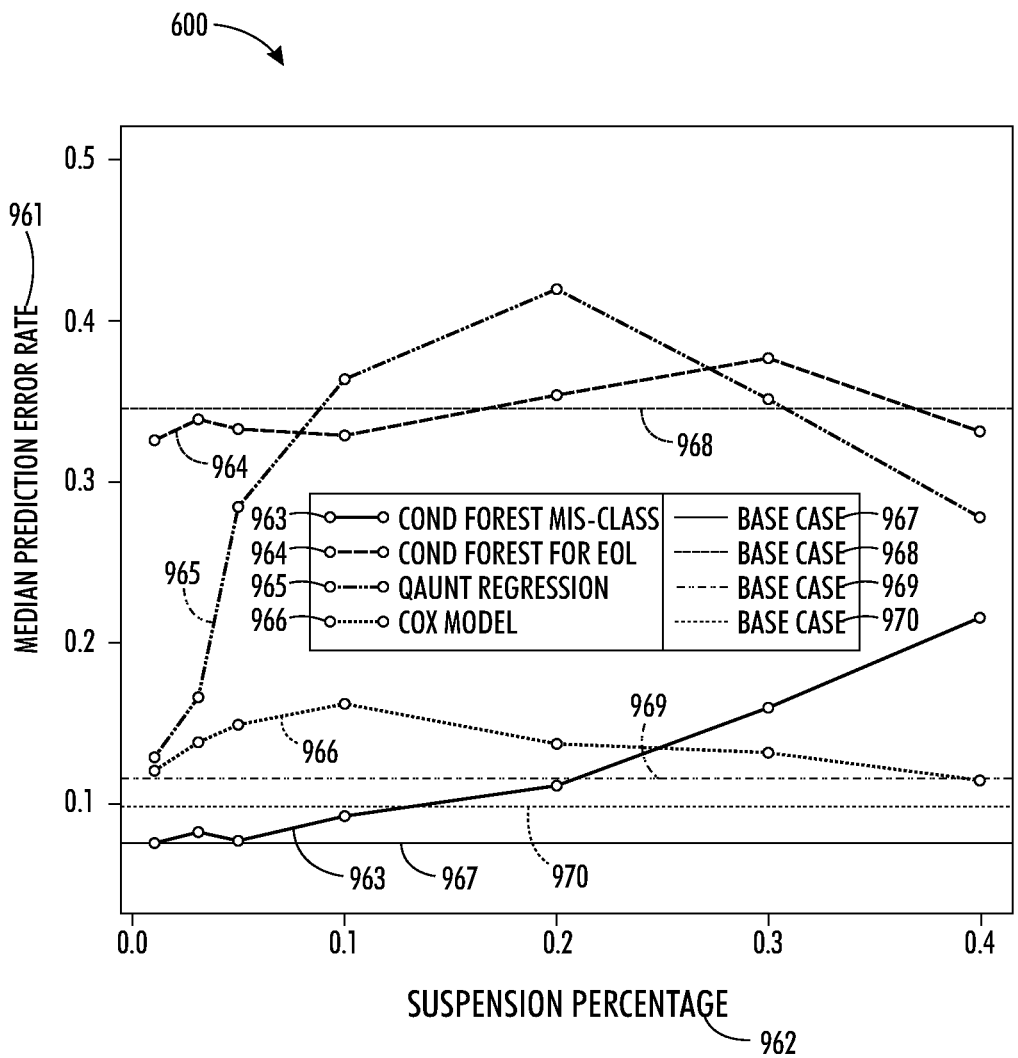
FIGS. 11 to 13 illustrate graphical representations of the results of RUL prediction using the disclosed statistical methods, in accordance with the disclosed embodiments.
Figure 12:
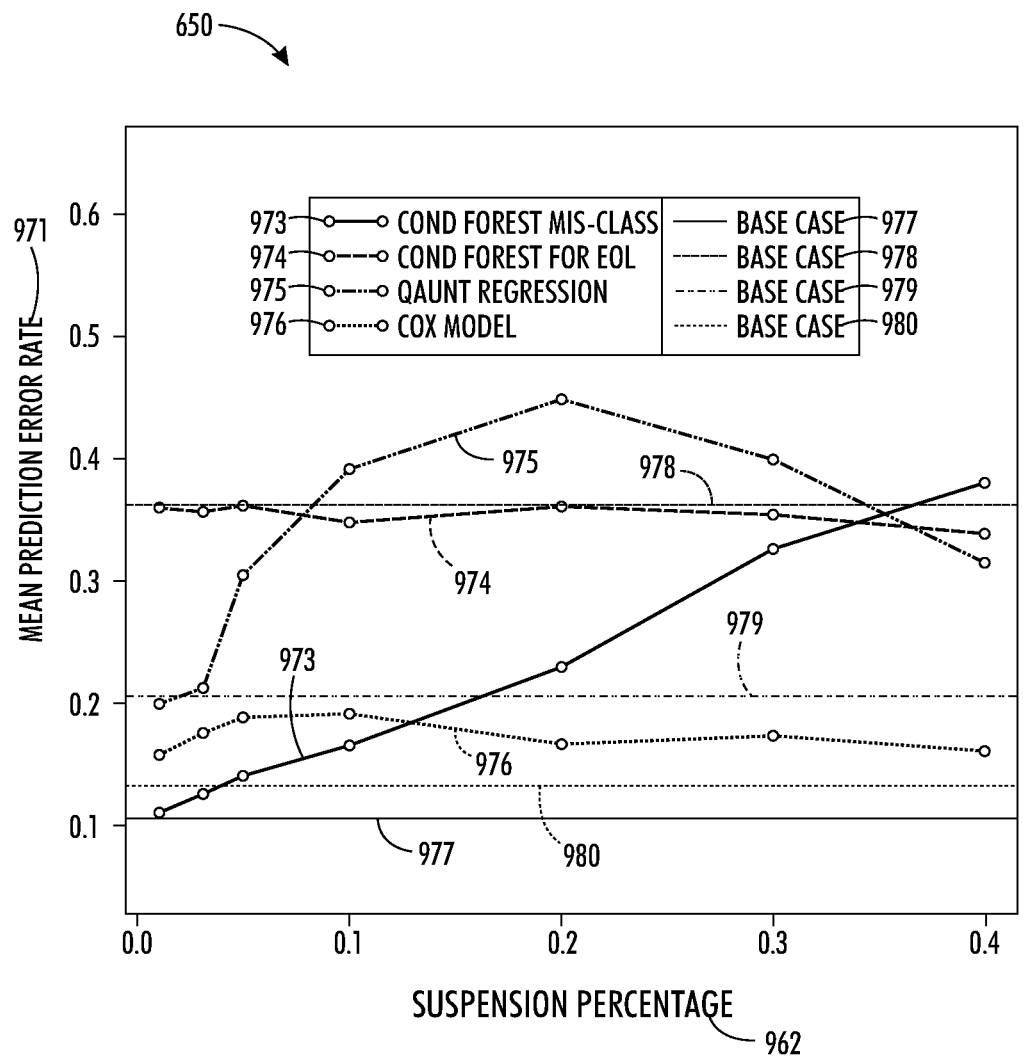
Figure 13:
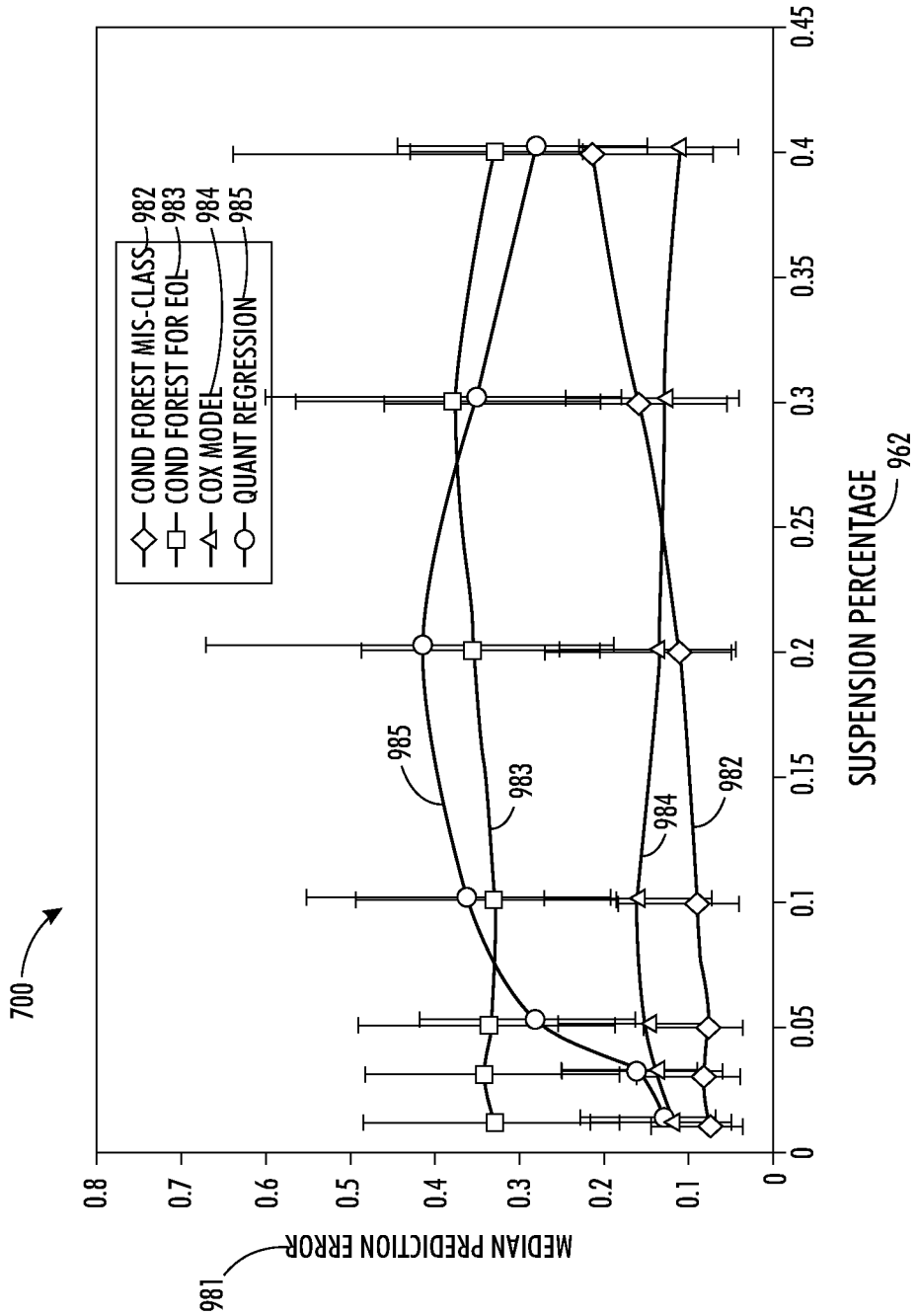

FIGS. 11 to 13 illustrate graphical representations of the results of RUL prediction using the disclosed statistical methods, in accordance with the disclosed embodiments. Four metrics including the median prediction error rate 961, the mean prediction error rate 971, the first quantile (1Q) and the third quantile (3Q) over the range of suspension percentage from 0% through 40% 962 are presented in FIGS. 11 to 13, respectively. FIG. 13 plots the median prediction error 981 with the bars representing the first quantile and the third quantile. The base cases, 967 to 970 in FIGS. 11, and 977 to 980 in FIG. 12 use no suspension in the dataset (i.e., the suspension percentage is 0).

Four RUL prediction methods are shown in FIGS. 11 to 13, including the Random Forest (CF) with misclassification 963, 973, 983, in FIGS. 11, 12, and 13, respectively, where all suspensions are viewed as failures; the Random Forest (CF) for the end of life (EOL) data 964, 974, 984 where only the end of life values for the parts are used in the analysis; the Cox Proportional Hazards Model for EOL data 966, 976, 986 as previously described; and the Quantile Regression (QR) Model for EOL data 965, 975, 985. In this example, only the Random Forest (CF) with misclassification 963, 973, 983 mislabels all suspensions as failures whereas the other three use the correct classification of the end statuses for each part in the data. In the case of misclassification 963, 973, 983, the suspension percentage is also the misclassification level.

Based on the results in FIGS. 11 to 13, some generic conclusions can be made as follows.

The base case for Random Forest with misclassification 963, 973, 983 yields the smallest prediction error compared to other methods. The Random Forest technique with misclassification 963, 973, 983 and the Cox Model for EOL data 966, 976, 986 are the two best methods since the corresponding RUL prediction errors are less than those of CF for EOL data 964, 974, 984 and QR for EOL data 965, 975, 985 in a wide range of the suspension percentage (0%~30%) for all four metrics. Specially, CF with misclassification 963, 973, 983 and the Cox for EOL 966, 976, 986 are more effective at accurate predictions than the other two methods over the whole range (0%~40%) in terms of the first quantile and the median of RUL prediction error 961. If information regarding suspensions and failures is not available, CF technique with misclassification 963, 973, 983 still can make acceptable RUL prediction when the suspension percentage is less than 20%.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

The invention claimed is:

1. A method for accurately predicting the remaining useful life of a device component, said method comprising:
generating time-to-failure data that shares the same characteristics with use data of a device component;
analyzing at least one operation condition and a device operation profile associated with said device component utilizing a statistical analysis based on a Monte Carlo technique;
analyzing the effects of suspension percentage and heavy-tailed behavior on said remaining useful life prediction;
analyzing a fixed-time predictor and a time-dependent covariate as indicators of remaining useful life of said device component; and
generating prediction data indicative of a remaining useful life of said device component in order to thereafter perform a condition-based preventive maintenance on said device component based on said remaining useful life of said device component.

2. The method of claim 1 further comprising performing said condition-based preventative maintenance on said device component based on said remaining useful life of said device component.

3. The method of claim 1 further comprising:
configuring said statistical analysis to comprise a General Path Model of analysis; and
generating via said General Path Model of analysis, simulated data that shares similar data characteristics of historical field failure data.

4. The method of claim 3 further comprising:
recording a degradation measurement taken at a specified time until said degradation measurement reaches a specified critical failure level, or
recording a degradation measurement taken at a specified time until said degradation measurement reaches a predetermined time.

5. The method of claim 1 wherein said statistical analysis further comprises a Random Forest Model of analysis, wherein said Random Forest Model comprises analyzing independent training decision trees on a set of data points to determine said remaining useful life of said device component.

6. The method of claim 1 further comprising:
specifying a model form for a wear indicator behavior, time-dependent covariate and said covariate's parameters;
generating said covariate using a regression model and a constant time predictor; and
incorporating a remaining useful life predictor into said collected time-to-failure data, wherein said remaining useful life predictor comprises at least one of the following: printing rate, area coverage, inferred dark decay signal, and market segment.

7. The method of claim 1 further comprising:
generating an actual degradation path for a device component; and
randomly generating a critical level from a specified distribution for said actual degradation path.

8. The method of claim 7 further comprising:
adding noise into said actual degradation path, wherein said noise comprises at least one of the following: censoring, heavy-tail, and misclassification; and
adding noise into time-to-failure data, wherein said noise comprises at least one of the following: censoring, heavy-tail, and misclassification.

9. The method of claim 1 further comprising:
computing failure time for said device component when said actual degradation path reaches a threshold value; and
predicting a distribution of time-to-failure of said device component based on said calculated failure time.

10. A system for accurately predicting the remaining useful life of a device component, said system comprising:
a processor;
a data bus coupled to said processor; and
a computer-usable medium embodying computer program code, said computer-usable medium being coupled to said data bus, said computer program code comprising instructions executable by said processor and configured for:
generating time-to-failure data that shares the same characteristics with use data of a device component;
analyzing at least one operation condition and a device operation profile associated with said device component utilizing a statistical analysis based on a Monte Carlo technique;
analyzing the effects of suspension percentage and heavy-tailed behavior on said remaining useful life prediction;
analyzing a fixed-time predictor and a time-dependent covariate as indicators of remaining useful life of said device component; and
generating prediction data indicative of a remaining useful life of said device component in order to thereafter perform a condition-based preventive maintenance on said device component based on said remaining useful life of said device component.

11. The system of claim 10 wherein said instructions are further configured for: performing said condition-based preventative maintenance on said device component based on said remaining useful life of said device component.

12. The system of claim 10 wherein said instructions are further configured for:
configuring said statistical analysis to comprise a General Path Model of analysis; and
generating via said General Path Model of analysis, simulated data that shares similar data characteristics of historical field failure data.

13. The system of claim 12 wherein said instructions are further configured for:
recording a degradation measurement taken at a specified time until said degradation measurement reaches a specified critical failure level, or
recording a degradation measurement taken at a specified time until said degradation measurement reaches a predetermined time.

14. The system of claim 10 wherein said statistical analysis further comprises a Random Forest Model of analysis, wherein said Random Forest Model comprises analyzing independent training decision trees on a set of data points to determine said remaining useful life of said device component.

15. The system of claim 10 wherein said instructions are further configured for:
specifying a model form for a wear indicator behavior, time-dependent covariate and said covariate's parameters;
generating said covariate using a regression model and a constant time predictor; and incorporating a remaining useful life predictor into said collected time-to-failure data, wherein said remaining useful life predictor comprises at least one of the following: printing rate, area coverage, inferred dark decay signal, and market segment.

16. The system of claim 10 wherein said instructions are further configured for:
generating an actual degradation path for a device component; and
randomly generating a critical level from a specified distribution for said actual degradation path.

17. The system of claim 16 wherein said instructions are further configured for:
adding noise into said actual degradation path, wherein said noise comprises at least one of the following: censoring, heavy-tail, and misclassification; and
adding noise into time-to-failure data, wherein said noise comprises at least one of the following: censoring, heavy-tail, and misclassification.

18. The system of claim 10 wherein said instructions are further configured for:
computing failure time for said device component when said actual degradation path reaches a threshold value; and
predicting a distribution of time-to-failure of said device component based on said calculated failure time.

19. A system for accurately predicting the remaining useful life of a device component, said system comprising:
a processor;
a data bus coupled to said processor; and
a computer-usable medium embodying computer program code, said computer-usable medium being coupled to said data bus, said computer program code comprising instructions executable by said processor and configured for:
generating time-to-failure data that shares the same characteristics with use data of a device component;
analyzing at least one operation condition and a device operation profile associated with said device component utilizing a statistical analysis based on a Monte Carlo technique, said statistical analysis further comprising a Random Forest Model of analysis, wherein said Random Forest Model comprises analyzing independent training decision trees on a set of data points to determine said remaining useful life of said device component; and
generating prediction data indicative of a remaining useful life of said device component in order to thereafter perform a condition-based preventive maintenance on said device component based on said remaining useful life of said device component.

20. The system of claim 19 wherein said instructions are further configured for: performing said condition-based preventative maintenance on said device component based on said remaining useful life of said device component.

* * * * *